Oct. 20, 1964     E. E. MESSMER     3,153,608
MACHINE FOR HEAT-TREATING SUPERPOSED PLIES OF PLASTIC MATERIAL
Filed Oct. 6, 1961     2 Sheets-Sheet 1
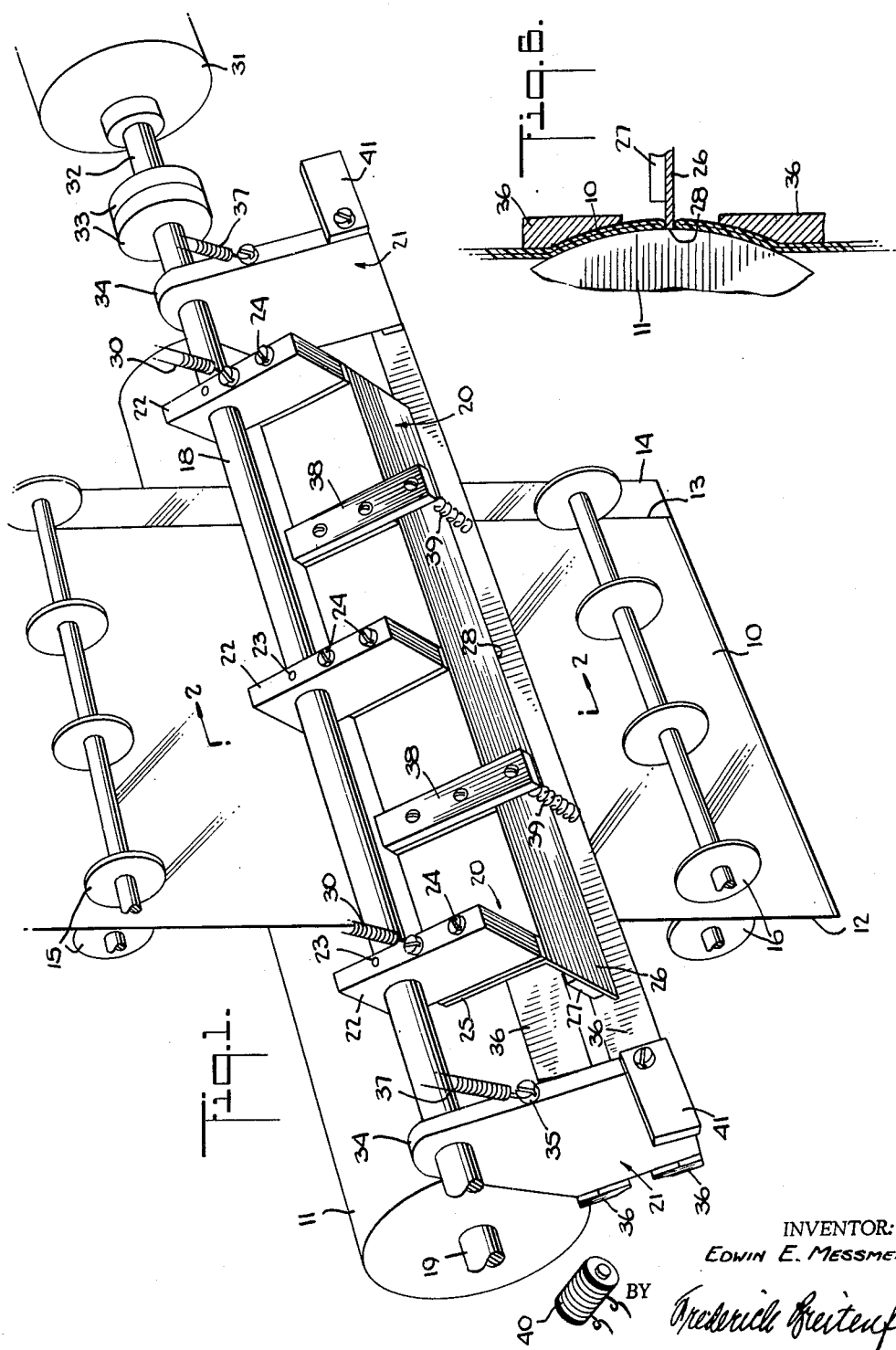
INVENTOR:
EDWIN E. MESSMER Oct. 20, 1964                E. E. MESSMER                3,153,608
          MACHINE FOR HEAT-TREATING SUPERPOSED PLIES OF PLASTIC MATERIAL
Filed Oct. 6, 1961                                        2 Sheets-Sheet 2
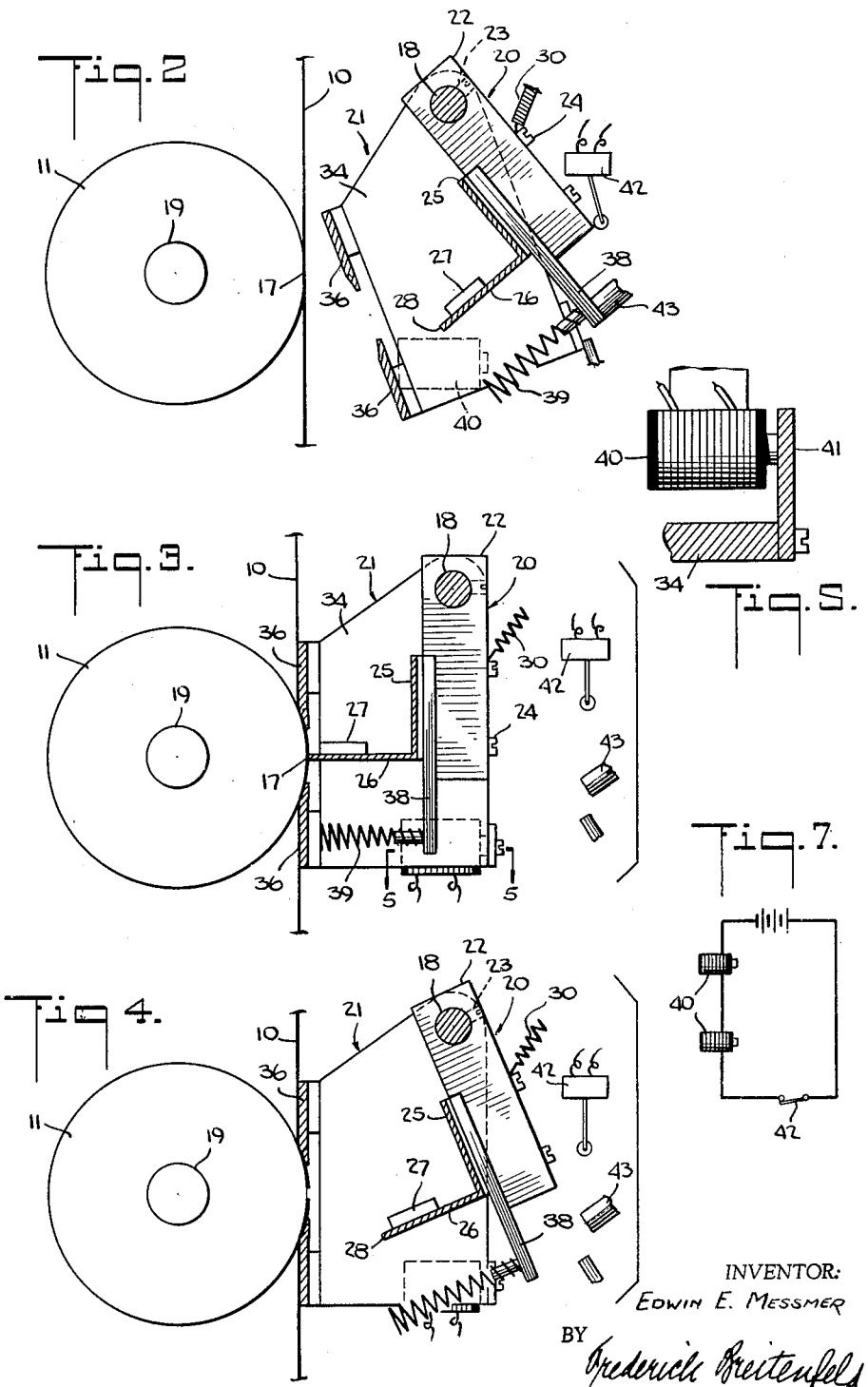
INVENTOR:
Edwin E. Messmer
BY Frederick Breitenfeld
ATTORNEY

United States Patent Office 3,153,608
Patented Oct. 20, 1964

3,153,608
MACHINE FOR HEAT-TREATING SUPERPOSED
PLIES OF PLASTIC MATERIAL
Edwin E. Messmer, 62 Arbor Lane, Roslyn Heights, N.Y.
Filed Oct. 6, 1961, Ser. No. 143,391
14 Claims. (Cl. 156—515)

This invention relates generally to the heat treatment of plastic sheet material, and has particular reference to an improved apparatus for heat-treating superposed plies of sheet material such as polyethylene in the manufacture of plastic bags.

It is a general objective to provide a simplified mechanism for temporarily engaging the plies to be treated, and for thereupon subjecting them to the desired heat treatment while they are held. The improved apparatus lends itself admirably to a procedure in which a continuous multiple-ply web is advanced intermittently to a heat-treatment station, and in which the treatment consists in the application of an attenuated heating element which severs and simultaneously seals the web along a transverse line.

A more particular objective of the invention is to provide an improved organization of elements, consisting of a backing, a clamp, and a heater, in which a simple and relatively inexpensive structure and mode of operation controls the movements of the clamp and heater, in predetermined sequence, toward and away from the backing. The objective is to move the clamp against the backing in advance of the heater, so that the plastic material to be treated is held securely as the heater moves against it; then to withdraw the heater while temporarily delaying the withdrawal of the clamp.

The improved apparatus is particularly useful in a bag-making machine in which a continuous web of "J-stock" is advanced intermittently along a vertical path, and in which it is periodically halted in a substantially vertical disposition to allow the desired clamping and heat-treatment to be performed.

One way of achieving the general object and advantages of the invention is illustrated in the accompanying drawings, in which—

FIGURE 1 is a perspective view of the essential elements of the improved mechanism, with all supporting framework and structure omitted for the sake of clarity;

FIGURE 2 is a cross-sectional view along the line 2—2 of FIGURE 1, showing the parts in one relationship;

FIGURE 3 is a view similar to FIGURE 2, showing the parts in the relationship they assume during the heat-treatment;

FIGURE 4 is a view similar to FIGURE 3, showing the heater withdrawn and the clamp temporarily delayed;

FIGURE 5 is a fragmentary enlarged cross-sectional view along the line 5—5 of FIGURE 3;

FIGURE 6 is a greatly enlarged fragmentary view of the region in which the heater is functioning, as indicated in FIGURE 3; and FIGURE 7 is a circuit diagram.

I have illustratively shown a continuous web of "J-stock" 10 traveling downwardly in a substantially vertical plane tangent to a relatively large roller 11 whose surface is adapted to serve as a backing for a heat treatment. The web of material may consist, for example, of a strip of polyethylene or the like, folded along a medial longitudinal line 12 (see FIG. 1) to bring the opposite longitudinal edges 13 and 14 of the strip into parallel proximity. This longitudinal folding of the strip to form a two-ply web 10, is accomplished before the web is subjected to the action of the present apparatus. For the purposes of the present disclosure, therefore, it may be assumed that the web 10 emanates from a supply roll or other source. Suitable means are provided for moving the web 10 intermittently in a downward direction. For this purpose, roller pairs 15 and 16, or equivalent driving and guiding mechanisms, may be employed. This driving and guiding means need not be shown in detail. Suffice it to point out that the advancing web 10 is intermittently brought to a halt with a predetermined length extending downwardly from the point of tangency 17 between the web 10 and the surface of the roller 11. The heat-treating apparatus herein chosen for illustration of the invention is designed to engage the web temporarily and hold it in this halted position, while an attenuated heater presses against the web as shown in FIGURES 3 and 6 to sever the web along a transverse line and to simultaneously seal together, along this line, the superposed plies of the plastic material. As a result of this action, that portion of the web which lies beyond the tangency line 17 constitutes a finished plastic bag. Repeated operations of this character obviously produce a succession of similar bags.

Adjacent to and parallel to the axis of roller 11 is a rotatable shaft 18. Its axis is somewhat higher than the axis of the shaft 19 on which the roller 11 is mounted. Supported on the shaft 18 in suspended relation thereto, is a carrier 20 for the heater, and a carrier 21 for the clamp. The carrier 20 includes a series of blocks 22 mounted on the shaft 18 in keyed relation thereto. This result may be accomplished by means of set-screws 23 or equivalent devices. Secured to the blocks 22 by means of bolts 24 or the like, is an L-shaped metallic element 25 one of whose arms (26) projects toward the backing roller 11. An elongated electric heating element 27 is mounted on the arm 26 in heating relation thereto, so that the exposed edge 28 of the arm 26 serves as an effective attenuated heating edge.

The electrical connections to the heater 27 have not been illustrated, since these are well-known per se.

The L-shaped element 25 is secured to the blocks 22 in such a position that the heated edge 28 moves directly to the tangency line 17 when the shaft 18 is rotated from the position shown in FIGURES 1 and 2 to the position shown in FIGURE 3.

Tension springs 30 extend between the rear edge of one or more of the blocks 22 to anchorages (not shown) on the framework of the machine. The springs 30 constantly urge the heater carrier toward the retracted or withdrawn position shown in FIGURES 1 and 2, and rotative movements of the shaft 18 (in a clockwise direction as viewed in FIGURES 2–4) swing the carrier in opposition to this yieldable spring action.

The rotation of the shaft 18 is accomplished by an electric motor 31 whose shaft 32 is in alignment with the shaft 18 and coupled therewith through a slipping clutch 33. In this way the heater automatically comes to a halt when it encounters the roller 11, even though the motor 31 may continue to rotate the shaft 32.

The clutch 33 is preferably of the electric type in which the axial separation and drawing together of the clutch elements is brought about by electromagnetic means (not shown). In such a device, the degree of firmness of engagement between the clutch elements, and the duration of such engagement, can be accurately controlled and regulated by varying the energy input, as by a rheostat, timer, time-delay instrument, or other component. As a result, the driving means comprising the motor 31 and slipping clutch 33 has been found to be eminently satisfactory as a gentle, yet effective, device for advancing the heater to operative position, pressing it against the plastic with an accurately variable degree of force, and holding it there for a time duration which is also accurately controllable and variable. The heater remains in the position shown in FIGURE 3 as long as the motor 31 continues to function and the clutch elements remain in engagement, and whenever the motor power is discontinued or the clutch elements disengaged (by any suitable switching or control means, not illustrated) the springs 30 are effective to withdraw the heater and restore the carrier to the position shown in FIGURES 1 and 2.

The clamp carrier 21 is similarly supported upon the shaft 18, except that the blocks 34 are not keyed to this shaft but are freely rotatable thereon. Extending between the blocks 34, and secured to the forward edges thereof by bolts 35 or the like are a pair of clamping bars 36. These bars extend parallel to the shaft 18 and to the axis of the backing roller 11, and are spaced from each other. The clamp elements 36 are so located that when the carrier is moved from the position of FIGURE 2 to that of FIGURES 3 and 4, the web 10 is temporarily clamped against the surface of the roller 11 in regions alongside the tangency line 17. This clamping action holds the web in a firm manner which facilitates the heating and severing action of the heater.

Acting upon the rear face of one or more of the blocks 34 of the clamp carrier are springs 37 which are anchored to the framework of the machine. They tend constantly to urge the clamp carrier into the retracted or withdrawn position shown in FIGURES 1 and 2. Movements of this carrier in the opposite direction are accomplished by the heater carrier. Secured to the rear face of the element 25 are bars 38 whose lower ends project beyond the level of the heater element 26. Carried by these free ends are compression springs 39 which project forwardly and are adapted to encounter the lower clamp bar 36. Thus, when the heater carrier starts its swinging movement from the position of FIGURE 2 to that of FIGURE 3 the spring elements 39 encounter the lower clamp 36 and thus push the clamp towards the backing 11 in advance of the heater. When the clamp has reached its end position, as shown in FIGURE 3, the heater carrier is permitted to travel further as the springs 39 become compressed. These springs serve as a yieldable means, interposed between the two carriers, for maintaining the clamp in advance of the heater.

After the heating action has been completed, it is desirable to delay the release of the web. To accomplish this result, the heater should be withdrawn, as indicated in FIGURE 4, but the clamp should be held in clamping position momentarily. This is accomplished in the present improved mechanism by means of one or more electromagnets 40, each of which is mounted on the framework of the machine in a position to be encountered by a magnetically-responsive element 41 secured to the rear face of one of the blocks 34 and projecting laterally as best indicated in FIGURE 1.

The duration of action of the magnets 40 can be accurately controlled in various ways. In the device illustrated, the magnets are arranged in an electric circuit as indicated in FIGURE 7, whereby they become energized when a switch 42 is closed, and deenergized when this switch is opened. By mounting the switch 42, in the form of a micro-switch, behind the heater carrier (FIGURES 2-4), the position of the heater carrier can be employed to control the actuation of the magnets 40. In FIGURE 2, for example, the heater carrier has encountered the movable part of the switch 42 to open the switch and break the magnet circuit. Whenever the heater carrier moves away from this position, the switch 42 is closed and the magnets 40 become energized. Thus, when the clamp carrier moves to the position of FIGURE 3, the parts 41 encounter the energized magnets 40 and are held in the position shown in FIGURES 3 and 4 until the heater carrier moves to its withdrawn position, thereby breaking the magnet circuit.

Since the duration of clamping action may be of critical importance in properly allowing the heat-treated web to cool, even small diminutions of the prescribed clamping time should be avoided. In the interest of reliable and uniform operation the heater carrier is provided with one or more magnetizable elements each of which encounters and is firmly but yieldably held by a permanent magnet whenever the heater carrier reaches its fully retracted position. One or more of the bars 38 can serve this function, encountering a permanent magnet 43 as indicated in FIGURE 2, or a bar or element of the character mentioned might be mounted on one of the blocks 22 and secured by one or more of the studs 24. Since the permanent magnet 43 holds the heater carrier against flutter, the cut-off switch 42 can be positionally located more accurately so as to deenergize the circuit of magnets 40 at the latest possible moment.

The deactivation of the magnets 40 may be delayed further, if desired, by a delay relay or equivalent component interposed in the magnet circuit. If direct current flows through this circuit, as indicated in FIGURE 7 by way of example, a condenser shunted across the magnet or magnets would serve this purpose.

Obviously, if desired, the parts 40 and 41 can be reversed, i.e., one of these is a magnet and the other an element attracted by it, and it makes no difference which function is served by which.

One of the advantages of the improved mechanism resides in its extreme simplicity and its inexpensive nature. The amount of energy required to rotate the shaft 18 and energize the clutch 33 is very small, especially since the carriers are mounted on the shaft in a suspended relation which greatly minimizes the amount of weight required to be moved. Also, this suspended engagement between the carriers and the actuating shaft 18 makes it a simple matter to restore the parts to normal condition, as shown in FIGURES 1 and 2, because the carriers by their own weight tend to assume these inoperative dispositions.

It is obvious that the intermittent advance of the web 10 is timed in relation to the actuation of the motor 31, or the engagement and disengagements of the clutch 33, but the means for accomplishing this has not been shown since any appropriate timing control may be used. In any case, some of the broader phases of the invention do not necessarily require that the apparatus work in conjunction with a continuous web of plastic material, intermittently advanced.

In general, it will be understood that many of the details herein described and illustrated may be modified by those skilled in the art without necessarily departing from the spirit and scope of the invention as expressed in the appended claims.

What is claimed is:

1. In a machine for heat-treating superposed plies of plastic material, a backing, a clamp, a heater, and means for moving the clamp and heater in predetermined sequence toward and away from the backing to engage the plastic material and heat-treat it while it is temporarily clamped against said backing, said means comprising a rotatable shaft, a clamp carrier freely rotatable on said shaft, a heater carrier keyed to said shaft, said carriers being so positioned that the heater is further from the backing than the clamp, and yieldable means between said carriers for moving the clamp toward the backing in advance of the heater when said shaft is rotated.

2. The combination of elements defined in claim 1, included means for rotating said shaft, and means for withdrawing the clamp and heater from the backing after the heat-treatment.

3. The combination of elements defined in claim 1, including means for rotating said shaft, means for withdrawing the clamp and heater from the backing after the heat-treatment, and means for causing the heater to move away from the backing first, said last-named means comprising an electromagnet effective to prevent withdrawal movement of the clamp carrier.

4. The combination of elements defined in claim 1, including spring means constantly urging the carriers away from the backing, and means for rotating said shaft to move said carriers in opposition to said spring means.

5. The combination of elements defined in claim 1, including spring means constantly urging the carriers away from the backing, means for rotating said shaft to move said carriers in opposition to said spring means, and an electromagnet effective to prevent the clamp carrier from withdrawing from the backing under the urgence of said spring means.

6. The combination of elements defined in claim 1, in which said shaft is rotated by a motive power applied through a slipping clutch, whereby the rotation of the shaft is halted automatically when the clamp and heater press against the backing.

7. In a machine for heat-treating superposed plies of plastic material, a backing, a heater, and means for oscillating the heater back and forth toward and away from the backing to heat-treat plastic material thereon, said means comprising a rotatable shaft, a heater carrier keyed to said shaft, a motor, and a slipping clutch between said motor and shaft whereby the rotation of the shaft is halted automatically when the heater presses against the backing.

8. The combination of elements defined in claim 7, in which said slipping clutch comprises clutch elements electromagnetically engageable with a variable degree of force.

9. In a machine for heat-treating superposed plies of plastic material, a backing, a clamp and a heater mounted on carriers for movements toward and away from the backing, means for moving the clamp and heater toward the backing in a sequence which causes the clamp to engage the plastic material before the heater encounters it, means for withdrawing the clamp and heater, and means for causing the heater to move away from the backing first, said last-named means comprising an electromagnet effective to prevent withdrawal movement of the clamp.

10. The combination with the elements defined in claim 9, of a circuit for said magnet, a switch in said circuit, and means effective by the heater carrier at the completion of its withdrawal movement for actuating said switch to deenergize said magnet.

11. The combination with the elements defined in claim 9, of a circuit for said magnet, a normally closed switch in said circuit, and means automatically effective whenever the heater carrier is in its fully withdrawn position for holding said switch open.

12. The combination with the elements defined in claim 9, of a circuit for said magnet, means effective by the heater carrier at the completion of its withdrawal movement for deenergizing said magnet, and releasable means for holding the heater carrier in its fully withdrawn position.

13. The combination of elements defined in claim 12, in which said holding means is a permanent magnet.

14. In a machine for heat-treating a web of plastic material, a backing roller mounted on a horizontal axis, a rotatable shaft mounted on a horizontal axis slightly above that of the backing roller, means for bringing the web to be treated to a substantially vertical disposition between said shaft and roller and directly adjacent to the roller in tangential relation thereto, a clamp carrier freely rotatable on said shaft and in pendent relation thereto, a heater carrier also in pendent relation to the shaft but keyed thereto, a clamp on the clamp carrier and a heater on the heater carrier, said carriers being so arranged that the heater is normally further from the backing roller than the clamp, means for rotating the shaft to rock said heater carrier so as to move the heater toward the line of tangency between said web and said backing roller, yieldable means between said carriers for transmitting said movement to said clamp so that the latter clamps said web while it is heated-treated, and said shaft rotating means including a slipping clutch which allows the rotating of the shaft to be halted automatically when the clamp and heater press said web against said backing roller.

References Cited in the file of this patent

UNITED STATES PATENTS

| 2,638,964 | Andina | May 19, 1953 |
| 2,661,981 | Okie | Dec. 8, 1953 |
| 3,028,294 | Histed | Apr. 3, 1962 |

FOREIGN PATENTS

| 740,811 | Great Britain | Nov. 23, 1955 |